March 6, 1934.  G. R. McDERMOTT  1,950,007
GAS BURNER FOR OPEN HEARTH FURNACES
Filed June 15, 1931
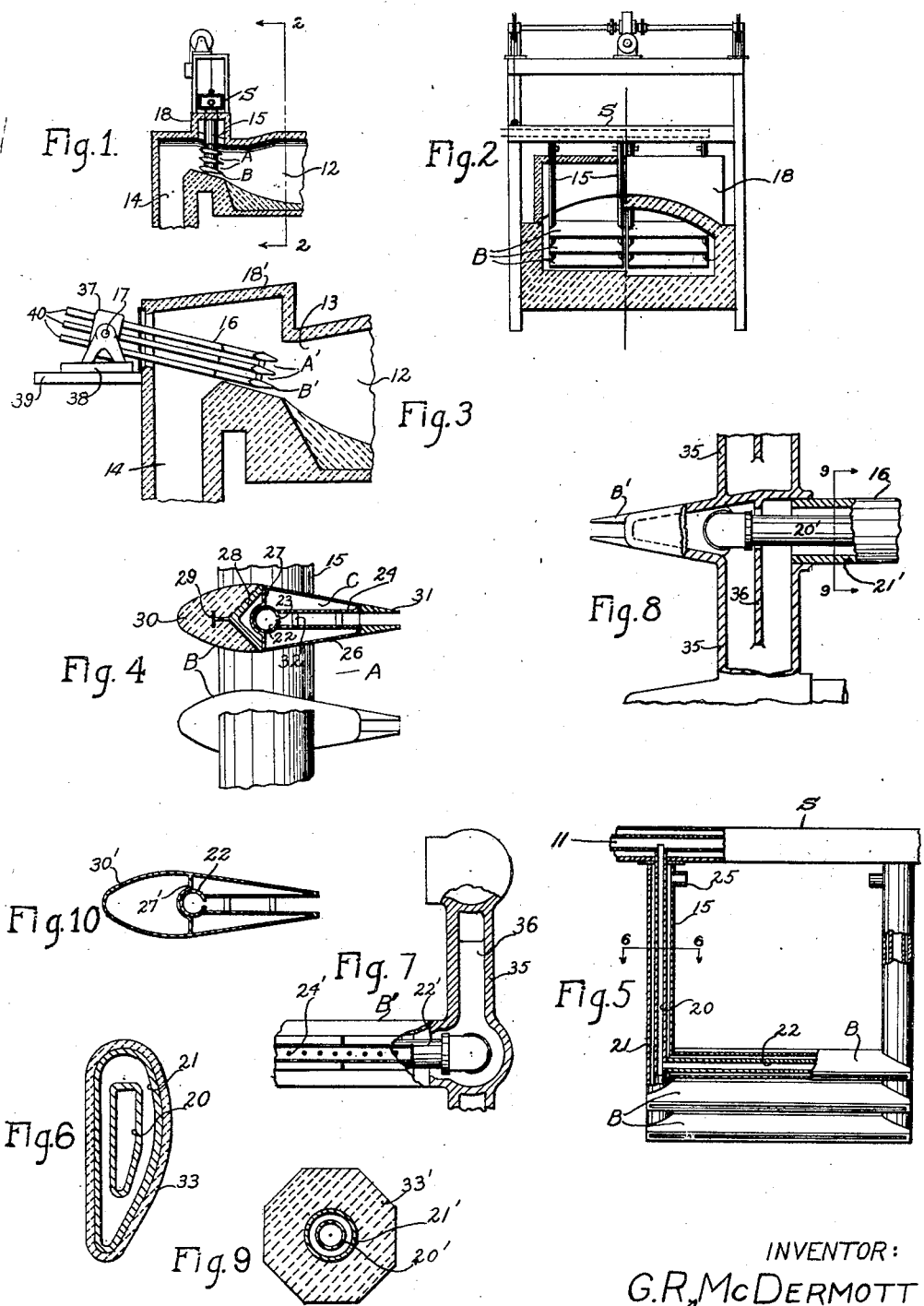
INVENTOR:
G. R. McDERMOTT
BY Charles A. Lind
ATTORNEY Patented Mar. 6, 1934

1,950,007

UNITED STATES PATENT OFFICE 1,950,007

GAS BURNER FOR OPEN HEARTH FURNACES

George R. McDermott, Toledo, Ohio, assignor to Surface Combustion Corporation, Toledo, Ohio, a corporation of New York Application June 15, 1931, Serial No. 544,496

8 Claims. (Cl. 158—104)

This invention relates to improvements in gas burners for industrial furnaces and has for its object to provide a gas burner which shall be particularly well adapted for use with furnaces provided with a channel or conduit which alternately serves as a port through which spent heating gases may leave the furnace and as a port through which air may be introduced into the furnace for supporting combustion of a fuel gas. An open hearth furnace is a typical example of furnaces of that type. More particularly it is an object of the invention to provide a gas burner which may be removably positioned in said channel; which shall be provided with means for forming a plurality of air passages in said channel, and which shall be provided with means for discharging fuel gas between the layers of air issuing from said passages to the end that combustion of the gas may take place relatively slowly in order to produce of a relatively long flame. Other objects will more fully appear hereinafter.

Referring to the accompanying drawing wherein the preferred embodiments of the invention are illustrated:—

Fig. 1 shows one way of applying the improved burner to an open hearth furnace, only so much of the latter being shown as will suffice to show the application of the invention;

Fig. 2 is a vertical section on line 2—2 of Fig. 1;

Fig. 3 shows another way of applying the burner to an open hearth furnace;

Fig. 4 is an enlarged fragmentary part, sectional and elevational, view of the burner shown in Fig. 1;

Fig. 5 is a fragmentary sectional and elevational view of details of the burner shown in Figs. 1 and 2;

Fig. 6 is a cross section on what would correspond to line 6—6 of Fig. 5;

Fig. 7 is a front elevational and sectional view of details of the burner shown in Fig. 3;

Fig. 8 is a side elevational and sectional view of details of the burner shown in Fig. 3;

Fig. 9 is a cross section on what would correspond to line 9—9 of Fig. 8, and

Fig. 10 is a section of a modified form of combined gas nozzle and cooling jacket therefor.

In the drawing, 12 indicates the heating chamber of an open hearth furnace from which extends a channel comprising a throat 13 and a downcomer 14, said channel serving alternately as a port through which spent heating gas may leave the heating chamber for flow to a regenerator, and as a port for supplying air to the gas to be burned, the gas in the present invention being supplied by the burner, the construction at one end of the furnace being duplicated at the other end.

Referring first to the construction shown in Fig. 1, the burner comprises a pair of side arms 15 which depend from a transversely extending support S which in turn is supported by a raising and lowering mechanism above the furnace. Extending between and supported by the side arms are stream line bodies B arranged in spaced relation to form passages A through which air from the conduit may flow on its way to the furnace chamber. To permit the bodies B to be raised clear of the channel, the furnace roof is upwardly recessed as at 18. Each of the side arms 15 comprises a pair of conduits 20 and 21. Within the support S is a conduit 11 which supplies gas to the conduits 20 (see Fig. 5). At the upper end of the conduits 21 is a water connection 25.

Generally speaking, each of the bodies B comprises a slot type gas nozzle 24 and a water jacket C, the preferred construction being shown in Fig. 4. In accordance with this construction, there is provided a transversely extending gas pipe 22 which is longitudinally ported as indicated at 23 for discharge into the gas nozzle 24. This gas pipe is coupled at its opposite ends to the gas supply conduits 20 of the side arms 15 (see Fig. 5). As clearly shown in Fig. 4, the water jacket comprises side walls 26 and an end wall 27 shown as concaved intermediate its ends to form a seat for the gas pipe 22. The opposite ends of the water jacket are in direct communication with the side arm conduits 21 as is clearly shown in Fig. 5 and hence water supplied by one of the conduits 21 will flow through the said jacket and leave by the other conduit 21. Cooperating with the water jacket C to form the stream line body B is a nose 30.

As shown in Fig. 4, the nose 30 is a refractory body secured by a T-shape anchorage 29 to an angled member 28, whose ends are secured to the ends of the wall 27. As shown in Fig. 10, the nose 30' may be hollow and extend directly from the end wall 27'. Positioned in the nozzle passage 24 are struts 32 to maintain the walls thereof in spaced relation. The tip of the gas nozzle may be a body 31 of heat resisting alloy. As shown in Fig. 6, the outer conduit 21 of each side arm 15 may be insulated by a refractory lining 33.

In Fig. 3 the bodies B' corresponding to the bodies B already described are supported in spaced relation as indicated at A' by side arms 16 supported by and extending from a support 37 turnably mounted as at 17 on a stool 38 supported by a base 39. To permit the bodies B' to be moved upwardly and clear of the channel, the furnace roof is upwardly recessed as at 18'. Each side arm consists of as many individual members 40 as there are bodies B'. Each of said members 40 comprises inner and outer conduits 20' and 21' (see Fig. 9) and the outer conduit may be insulated by a refractory covering 33'. The inner conduit 20' is a gas supply conduit and the outer conduit 21' is a water conduit.

As shown in Figs. 7 and 8, the bodies B' extend between and are secured to hollow side supports 35 which connect the adjacent ends of the members 40 making up each side arm 16. In Fig. 7, the elements 22' and 24' correspond respectively to the gas pipe 22 and nozzle 24 in Fig. 4. Partitions 36 may be provided within the supports to insure proper circulation of the cooling water, it being understood that such water is admitted through one set of side conduits 21' and exhausted by the other set.

Due to the fact that the channel wherein the burner is positioned is relatively wide transversely of the furnace, it is preferred to construct the burner in two or more units arranged side by side as shown in Fig. 2.

By causing the air from the conduit 14 to flow through the passages between the bodies B and by discharging the gas from such bodies, mixing of the air and gas proceeds relatively slowly with the consequent production of a relatively long flame.

A burner of the type described has special utility in connection with furnaces which are already provided with a channel as and for the purpose described, it being understood that the complementary gas port usually provided has no utility when the present burner is used.

What I claim is new and desire to secure by Letters Patent is:

1. In a gas burner, the combination of a plurality of bodies arranged in spaced parallel relation to form air passages between themselves, parallelly extending supports between which said bodies are supported, gas nozzles extending from within said bodies, and means associated with said supports for supplying gas to said nozzles.

2. In a gas burner, the combination of a plurality of bodies arranged in spaced parallel relation to form air passages between themselves, parallelly extending supports between which said bodies are supported, gas nozzles extending from within said bodies, and means associated with said supports for supplying cooling fluid to said nozzles.

3. In a gas burner, the combination of a slot type gas nozzle, a water jacket surrounding the nozzle, and a refractory member at the front end of the jacket, said member and jacket together making up a body of stream line section.

4. In a gas burner, the combination of a plurality of slot type gas nozzles in spaced relation, side arms between which said nozzles extend and by which they are supported, means associated with said arms for supplying gas to said nozzles, a cooling jacket for each nozzle, and means associated with said arms for supplying cooling fluid to said jackets.

5. In a gas burner, the combination of a plurality of slot type gas nozzles in spaced relation, side arms between which said nozzles extend and by which they are supported, a cooling jacket for each nozzle, said arms comprising telescoped conduits, one of which conduits supplies gas to the gas nozzles and the other of which supplies cooling fluid to the water jackets.

6. The combination with a furnace having a channel through which air may enter the furnace, of a plurality of bodies extending across said channel in spaced relation to divide the channel into a plurality of discharge passages, laterally spaced arms within and extending from said channel and by and between which said bodies are supported, gas nozzles housed by said bodies, and means associated with said arms for supplying gas to the said nozzles.

7. The combination with a furnace having a channel through which air may enter the furnace, of a plurality of bodies extending across said channel in spaced relation to divide the channel into a plurality of discharge passages, laterally spaced arms within and extending from said channel and by and between which said bodies are supported, gas nozzles housed by said bodies, and means associated with said arms for supplying gas to the said nozzles and for supplying cooling fluid to the interior of said bodies.

8. The combination with a furnace having a channel through which air may enter the furnace, of a plurality of bodies extending across said channel in spaced relation to divide the channel into a plurality of discharge passages, laterally spaced arms within and extending from said channel and by and between which said bodies are supported, gas nozzles housed by said bodies, means associated with said arms for supplying gas to said nozzles, and means outside of said channel for supporting said arms.

GEORGE R. McDERMOTT.